United States Patent [19]
Tardoskegyi

[11] 3,989,180
[45] Nov. 2, 1976

[54] WAVE SOLDERING WITH SUPPORTED INCLINED WAVE

[75] Inventor: Louis V. Tardoskegyi, Montreal, Canada

[73] Assignee: Electrovert Manufacturing Company, Limited, Montreal, Canada

[22] Filed: Jan. 24, 1975

[21] Appl. No.: 543,886

Related U.S. Application Data

[63] Continuation of Ser. No. 297,833, Oct. 16, 1972, abandoned.

[30] Foreign Application Priority Data

Nov. 10, 1971 United Kingdom ............... 52316/71

[52] U.S. Cl. ........................ 228/180 R; 228/260; 228/37
[51] Int. Cl.[2] ..................... B23K 1/08; B23K 31/02
[58] Field of Search .................... 228/37, 180, 260

[56] References Cited
UNITED STATES PATENTS

| | | | |
|---|---|---|---|
| 2,993,272 | 7/1961 | Carlzen et al. ..................... | 228/256 |
| 3,100,471 | 8/1963 | Gutbier ............................... | 228/180 |
| 3,605,244 | 9/1971 | Osborne et al. ................... | 228/37 X |
| 3,713,876 | 1/1973 | Lavric ................................ | 228/37 X |
| 3,726,007 | 4/1973 | Keller ............................... | 228/180 X |
| 3,726,465 | 4/1973 | Boynton et al. ................... | 228/37 |
| 3,921,888 | 11/1975 | Elliot et al. ........................ | 228/37 X |

FOREIGN PATENTS OR APPLICATIONS

798,454  7/1958  United Kingdom .................. 228/37

Primary Examiner—Ronald J. Shore
Attorney, Agent, or Firm—McGlew and Tuttle

[57] ABSTRACT

Workpieces, such as printed circuit boards, are processed by passing the boards in contact with a standing wave of molten solder formed by circulating molten solder upwardly through a nozzle to overflow at least one edge thereof to form a standing wave which is accelerated by gravity so as normally to have an upper surface ballistically curved in the direction of flow. In accordance with the invention, the undersurface of the standing wave is supported to have a ballistic curvature, in the direction of flow, such that a major portion of the upper surface of the wave is substantially planar with the cross-sectional area of the wave varying, in the direction of flow, in a manner similar to the variation of the cross-sectional area of an unsupported wave following a ballistic curve in is trajectory. This results in the upper surface of the wave being substantially planar throughout a major portion of its length, and inclined downwardly from the horizontal, at a small angle, in the direction of flow of the solder. The angle to the horizontal may be varied between 3°–10° but preferably is from 4° to 6°. Supporting of the undersurface of the wave is effected by an extension of at least one wall of the nozzle, in the direction of solder flow, this extendsion having a ballistic curvature in the direction of solder flow of an extent such that the upper surface of the standing wave is substantially flat and inclined downwardly in the direction of the flow.

14 Claims, 8 Drawing Figures

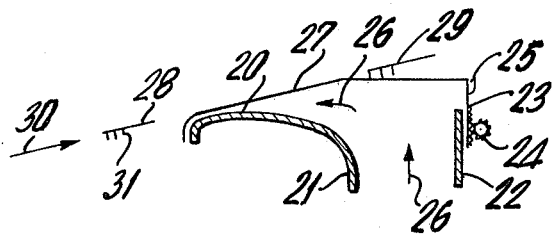
FIG. 3a
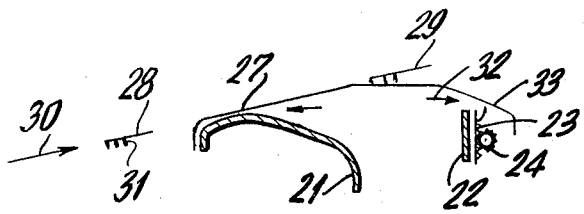
FIG. 3b
  
FIG. 4a  FIG. 4b  FIG. 4c
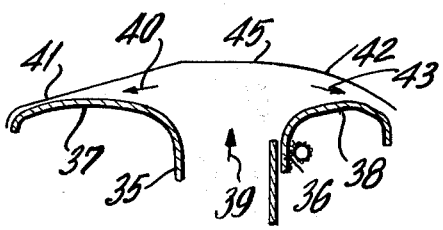
FIG. 5

WAVE SOLDERING WITH SUPPORTED INCLINED WAVE

CROSS-REFERENCE TO RELATED APPLICATION

This application is a continuation of application Ser. No. 297,833, filed Oct. 16, 1972, and now abandoned.

FIELD AND BACKGROUND OF THE INVENTION

This invention relates to soldering and, more particularly, to an improved method and apparatus for soldering or tinning printed circuit boards by passing the same through a standing wave of molten solder.

A known technique for processing printed circuit boards involves the tinning or coating of the printed circuits with solder, by passing the boards with their printed circuit surfaces in contact with a standing wave of molten solder. The boards may also be fluxed, before passing through the standing wave of molten solder, by passing the boards through a standing wave of liquid flux. The standing wave of molten solder is produced by causing an upward flow of molten solder through a nozzle having a substantially rectangular discharge opening extending laterally of the wave, so that the molten solder overflows the edges of the nozzle and returns to a solder tank. The wave may be either one-sided, in which case it overflows only one longer edge of the nozzle, or it may be double-sided, in which case it overflows both longer edges of the nozzle discharge opening.

A molten solder wave, in the same manner as any free flowing liquid material, develops a pattern similar to that of a water jet discharged under pressure from a nozzle. Depending on the initial angle of the nozzle, the water jet will either initially travel horizontally or initially travel upwardly but, under the influence of gravitational forces, the stream of water tends to flatten and then to drop with ever increasing speed. That is, it is accelerated downwardly by gravity so that the shape of the water jet is the same as a ballistic line having a similar initial velocity and angle. As the flow quantity is equal at any point along the line, with increasing speed, the cross-sectional area of the flowing stream decreases.

Soon after the introduction of wave soldering for processing printed circuit boards, various types of so-called wave formers were used to extend the standing wave. Soldering was effected further on, on the top of the wave, but that part of the wave which was not in contact with the printed circuit board imparted some preheating and/or after heating, by radiation, to the board, which facilitated icicle-free soldering.

However, the application of these wave formers did not change the shape of the upper or active surface of the wave actually engaged in the soldering operation, which still maintained a ballistic curvature under the influence of gravitational forces. With the exponential increase in the number of printed circuit boards to be soldered, the soldering process, over the years, has had to be accelerated or speeded up.

Despite the fact that the best soldering is produced when the solder wave just touches the printed wiring, it was quite common to attempt to elongate the contact length, between the solder and the printed circuit board, by pressing the board into the wave to flatten the wave top or upper surface. In this procedure, longer contact time and higher speeds were achieved, but accompanied with the formation of icicles. This compromises the results, but the results were accepted because no better way was available.

When the weight of electronic assemblies turned to be important, especially in the aerospace industry, inclined transfer application came into use because, at the exit point from the wave, the solder areas were drained better with respect to adhering solder, thus leaving less excess solder on the board.

With all known arrangements, it has been difficult to obtain more than a point contact between the peak of the wave and the surface of a printed circuit board and, as mentioned, the width of the contact band, actually the length of contact between the solder wave and the board in the direction of travel, generally has been increased only by pressing the board into a wider surface contact with the solder wave. This results, among other things, in an unnecessarily heavy coating of the solder on the printed circuit board connections. Furthermore, pressing a board into the wave to some extent in order to flatten the wave for a distance of the order of maybe 1 or 2 inches, results in the normally parabolic shape of the wave assuming a mushroom curvature, which interferes with draining of the solder from the trailing edge of the board passing through the wave and results in solder icicles depending from the board.

In this connection, it should be emphasized that one of the important factors in connection with wave soldering is to maintain the exit angle, that is the angle between the under-surface of the board and the flowing solder, as small as possible in order to maintain heat on the "draining" end of the board to prevent formation of icicles of solder. None of the prior art arrangements providing a more extended contact of the board with the molten solder wave by depressing the board into the wave are effective to prevent formation of such icicles.

SUMMARY OF THE INVENTION

In accordance with the present invention, the flowing solder wave is supported by a surface which is so shaped that the upper surface of the solder wave has a required or desired contour, preferably one which is substantially flat for the major portion of its length. Also, the upper surface of the thus supported wave is inclined downwardly in the direction of solder flow at an angle of 3° to 10° and preferably 4° to 6° to the horizontal.

In the apparatus for performing the method of the invention, one wall of the solder nozzle has an extension which underlies the flowing solder wave and has a predetermined shape such that it supports the under-surface of the wave to have a ballistic curvature, in the direction of flow, such that a major portion of the upper surface of the wave is substantially planar. In addition, the cross-sectional area of the wave varies, in the direction of flow, in the same manner as the cross-sectional area of an unsupported wave following a ballistic curve in its trajectory.

In one embodiment of the invention, molten solder is pumped over a contoured surface from a nozzle having a back plate which is adjustable in height in order to enable the contour of the solder surface to be varied.

In another embodiment, the molten solder is pumped through a nozzle between two contoured support surfaces so that it flows in opposite directions over the two contoured support surfaces.

By virtue of the contoured support surface for the underside of the solder wave, the printed circuit boards may be passed in contact with the planar portion of the wave and the aforementioned exit angles of the printed circuit boards, relative to the surface of the standing wave, the extended contact area and the inclination are such that solder icicle formation is completely inhibited.

Extremely thin and densely packed printed lines have a tendency to become bridged and thus shorted by the least excessive solder, helped by the high surface tension of the solder expecially when oxygen is present. The oxidized surface film is very tough and tends to support the bridges between the lines. To avoid this latter effect, oil usually is mixed into the solder stream to reduce the surface tension. In the present invention, the thermodynamic aspects of the elongated controlled contact band width, the inclination of the flat wave surface and the controlled exit not only eliminate icicles but, by eliminating excessive solder, also eliminate bridging even of fine line circuits and also, when high soldering speeds are used, without the use of oil. If special considerations, like extremely thin and densely packaged circuits, large land areas, or requirements to exclude direct contact between the wave surface and the environment, may suggest the use of oil, oil should be applied to the surface of the solder wave only. By this, such disadvantageous effects as, for example, oil entrapment or oil to be frozen into the solder fillet, will be excluded, which disadvantages will occur when oil is injected into the solder flow or intermixed with the solder flow. Also, the design is such that the oil flow can be shut off or initiated at any time during the soldering operation without interrupting the operation.

An object of the invention is to provide an improved method for soldering printed circuit boards.

Another object of the invention is to provide an improved apparatus for soldering printed circuit boards.

A further object of the invention is to provide such a method and apparatus in which the printed circuit board, passing through a standing wave of molten solder, is enabled to have an enlarged contact area, actually an elongated "line" contact in the direction of travel as distinguished from a "point" contact, with the upper surface of the standing wave. This is offered by the elongated planar portion of the wave surface without the necessity of pressing the printed circuit board into the wave.

Another object of the invention is to provide such a method and apparatus in which the undersurface of the flowing wave of solder is supported so as to have a ballistic curvature in the direction of flow such that a major portion of the upper surface of the wave is substantially planar.

A further object of the invention is to provide such a method and apparatus in which the planar contact area of the upper surface of the solder wave is inclined to the horizontal.

Another object of the invention is to provide such a method and apparatus in which the length and inclination of the planar contact surface can be varied by varying the length and inclination of a wave-supporting nozzle plate, by controlling the rear half of a double sided wave, or by varying the length, shape, or orientation of the nozzle plate together with controlling the rear half of the wave by a nozzle back plate.

A further object of the invention is to provide such a method and apparatus in which the wave configuration is controlled to establish an acute separation angle between the wave surface and that of the printed circuit board.

Another object of the invention is to provide such a method and apparatus involving controlled shaping of the solder wave, for optimum exit conditions, by establishing the optimal velocity relationship between the traveling speed of the printed circuit board and that section of the solder wave surface where the printed circuit board, or structural parts of the assembly, such as component leads, connector pins, socket pins or the like, exit from the solder wave.

Yet another object of the invention is to provide such a method and apparatus in which the cross-sectional area of the wave varies, in the direction of flow, in the same manner as the cross-sectional area of an unsupported wave following a ballistic curve in its trajectory, but with the upper surface of the wave, through a major portion of its length, being substantially planar.

For an understanding of the principles of the invention, reference is made to the following description of typical embodiments thereof as illustrated in the accompanying drawings.

BRIEF DESCRIPTION OF THE DRAWINGS

In the drawings:

FIGS. 3a and 3b are diagrammatic cross-sections through arrangements similar to that shown in FIG. 2, but involving an adjustable back plate;

FIGS. 4a, 4b and 4c are diagrammatic cross-sections through solder flows obtained using the arrangement of FIGS. 3a and 3b; and FIG. 5 is a diagrammatic cross-section through a further solder flow arrangement embodying the invention.

DESCRIPTION OF THE PREFERRED EMBODIMENTS

Figure 1:
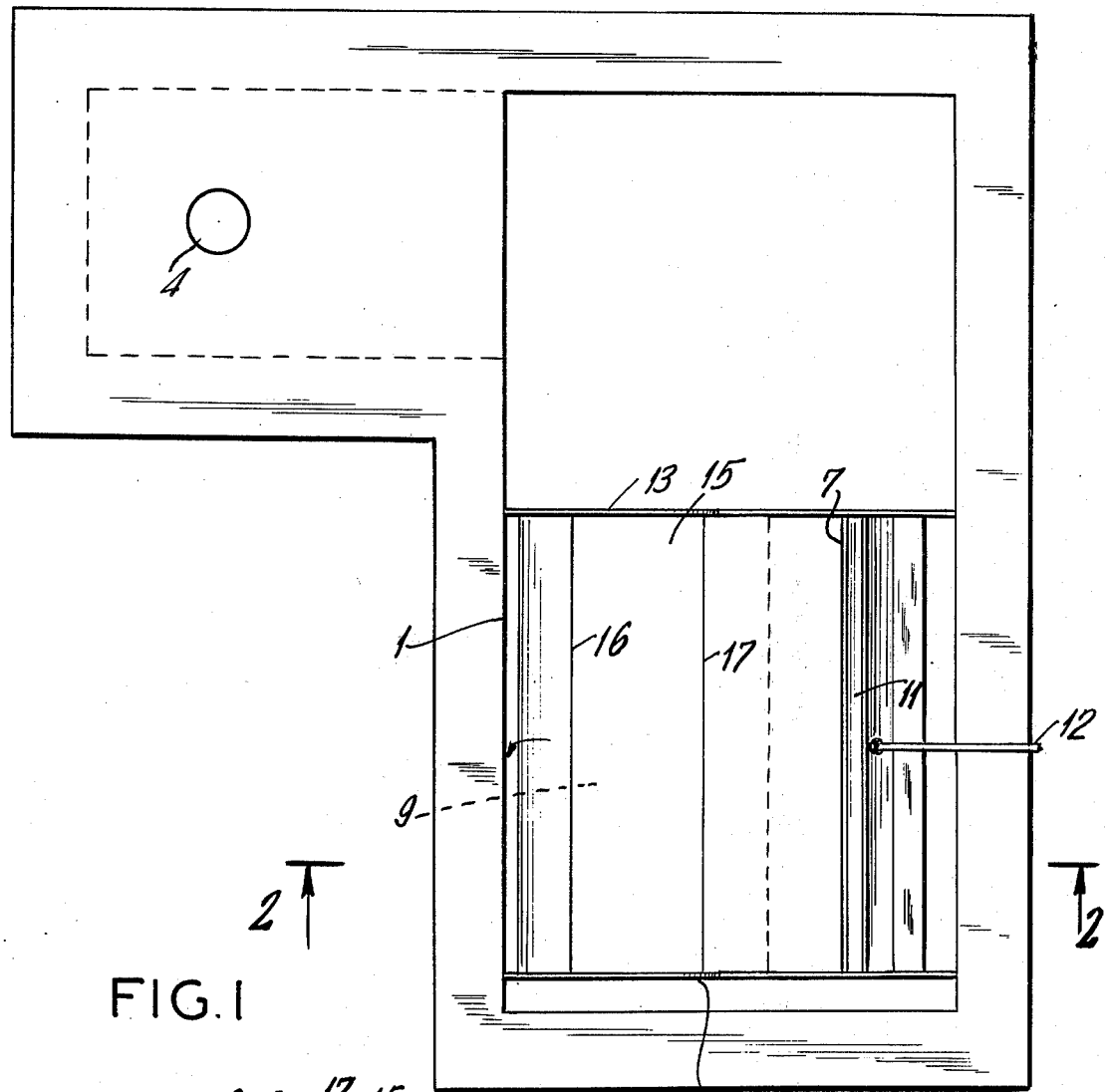
FIG. 1 is a plan view of wave soldering apparatus embodying the invention.
Figure 2:
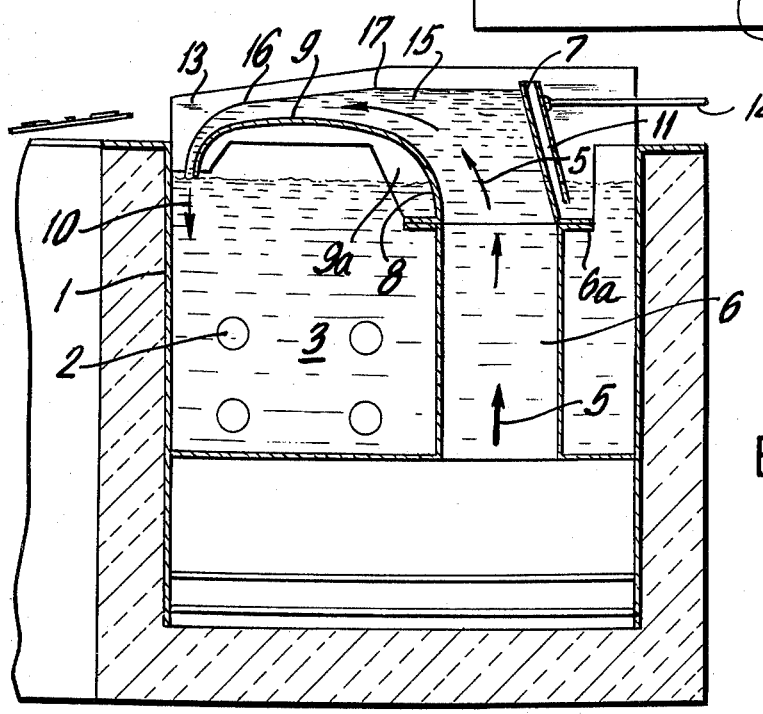
FIG. 2 is a section taken along the line II—II of FIG. 1.

Referring to FIGS. 1 and 2, a thermally insulated solder tank or bath 1 includes heaters 2 arranged to maintain solder 3 in a molten condition. A pump 4 is provided to exert pressure on the molten solder in tank 1 so that the molten solder will flow upwardly, in the direction of arrows 5, through a substantially vertically oriented longitudinal channel 6 and into a nozzle constituted by a back plate 7 and a part 8 of support plate 9. The upper end of channel 6 has horizontal flanges 6a on which are superposed horizontal flanges on the back plate 7 and the part 8 of support plate 9, the superposed flanges being secured together. Additionally, support ribs 9a may extend longitudinally of support plate 9.

The molten solder, flowing upwardly through channel 6, flows over support plate 9 and returns to bath or tank 1, as indicated by the arrow 10. A film of oil can be provided on the solder surface from a reservoir or trough 11 supplied with oil through a pipe 12. The longitudinal edges of the solder wave are combined by side or baffle plates 13 and 14.

A solder wave 15 is thus confined laterally between baffle plates 13 and 14 which can be, for example, from 4 inches to 30 inches apart as required by the maximum width of printed circuit board to be processed and by the length of the nozzle and the back plate 7. The wave support plate 9 is an important feature of the invention and, together with the use of a properly formed nozzle system and back plate, enables the formation of a perfectly planar long inclined solder wave.

In operation, as the molten solder is forced upwardly through channel 6 to flow over support plate 9 between baffles 13 and 14, it flows in a forward direction, or to the left as viewed in FIG. 2, under gravitational forces and with accelerating speed. If the flow were not guided by a support plate 9, the upper surface of the molten solder stream would be curved in a manner similar to that of a ballistic curve. If this curved upper surface of the wave were used for soldering printed circuit boards, the undersurfaces of the boards, theoretically, will touch the upper, curved surface of the solder wave with a line contact. However, in practice, by pressing the board downwardly into the wave, a wider contact area or contact length of about 1 to 1.5 inches in the direction of travel can be produced, but with disadvantageous results from the standpoint of formation of solder icicles.

To improve the soldering, and in particular to produce satisfactory soldering results at elevated speeds and to speed up substantially the production rate, support plate 9 is so formed that the distance between the upper surface of wave 15 and support plate 9 is so chosen, at every point, that the accelerating stream of molten solder has a planar sloping upper surface between the points 16 and 17, and a ballistically curved lower surface. This lower surface is ballistically curved by virtue of the ballistically curved support plate 9, as apparent in FIG. 2. Also, the cross-sectional area of the flowing solder varies, in the direction of flow, in the same manner as the cross-sectional area of an unsupported wave following a ballistic curve in its trajectory. This enables elongated line contact in the direction of travel and, consequently, also the regulated contact desired, between the printed circuit board and the solder. Also, if the printed circuit board only touches the solder surface, the harmful consequences of depressing the board into the wave are obviated.

With the described arrangement, any length of contact between a printed circuit board and the planar upper surface of wave 15, between points 16 and 17, can be produced in accordance with desired conditions. The latest demands, based on high production rates may require a contact length, between the points 16 and 17, of 4 inches but prior to the present invention, it has not been possible to produce a flow of solder with such a contact width and with a sloping surface. The design in accordance with the invention, however, has the potential of reducing the contact length between points 16 and 17 to 2 inches or increasing it to 6 inches or more, if required.

The effect of the sloping wave of solder with an extended planar contact area is that, it causes excess solder to be peeled off the printed circuit conductors, resulting in lighter boards, which is an extremely important advantage in aerospace applications; it is an important cost saving factor by reducing solder consumption in any soldering operation.

Since the "peel back" and drainage of the solder is performed under controlled condition by appropriately shaped wave contours, the formation of sound and reliable solder fillets is assured as opposed to conventional wave soldering operations under an inclined angle where fillets of unsatisfactory solder volume or such showing marked assymetric are formed due to uncontrolled wave flow patterns and flow conditions affecting as a consequence the reliability of the operations.

The elimination of excess solder combined with the elimination of solder icicles under controlled conditions at soldering speeds exceeding by a multiple those of conventional, horizontal wavesoldering operations and at speeds exceeding those of conventional inclined transfer type wave soldering operations, and without the use of oil, is an advantage of the novel concept.

A further advantage of the arrangements is that, it will eliminate the formation of solder bridges between the P. C. conductors and/or connector pins, socket pins, or the like, offering the benefit essentially also if thin and densely packed, so-called "fine line" printed circuitry has to be soldered at elevated speeds compared to conventional soldering operations. Such advantages will be prevalent also if oil is not used in the soldering operation.

All of these cited benefits which the novel technique can offer will make quality control easier, will improve reliablity and result in saving of solder.

A further advantage of the described arrangement is that, if conditions require, the wave can be covered by oil, in a known manner, by supplying oil from reservoir or trough 11 which corresponds to the oil nozzle of Tardoskegyi, U.S. Pat. No. 3,190,527. A calibrated quantity of oil can be pumped into reservoir or trough 11, and this oil is then distributed evenly over the surface of the wave.

While the drawings illustrate the upper surface of wave 15, between points 16 and 17, as being inclined downwardly in a direction of flow at a selected angle, it will be appreciated that, by proper orientation of support plate 9, this portion of the surface of the solder wave could be horizontal. In practice, the angle to the horizontal is selected to be from 3° to 10°, and preferably 4° or 6°.

Referring to FIG. 3a, the arrangement illustrated in cross-section has a solder wave support plate 20, corresponding to the plate 9 of FIGS. 1 and 2, which forms, with its portion 21, a part of the nozzle for the solder flow. The other side of the nozzle is defined by a fixed plate 22 and a plate member 23 which is movable vertically by appropriate means, such as a rack and pinion 24, for example. Plate member 23 may carry a trough 25 for oil, if conditions require the use of oil.

With plate member 23 raised, as shown in FIG. 3a, and molten solder flowing upwardly and forwardly in the direction of the arrows 26, the support plate 20 imparts, to the upper surface of the solder wave, a substantially planar sloping surface 27. Printed circuit boards, as indicated at 28 and 29, are conveyed in the direction of the arrow 30 so that they contact the upper surface 27 of the solder wave and pass through it in a direction opposite to the flow direction of the solder wave. Back plate member 23 may have the shape shown in FIG. 5.

In FIG. 3b, plate member 23 is illustrated as lowered by means of the rack and pinion 24, so that some of the solder is allowed to flow in the direction of the arrow 32, or opposite to the direction of flow of the solder wave having the planar surface portion 27. This alters the rate of flow of the solder at surface 33, which effects the manner in which, for example, the solder is peeled off from connector pins or similar structural parts 31. The speed of this peeling or backward wave surface 33 can be adjusted to accommodate the speed of the conveyor carrying the printed circuit boards, so that the connector pins 31 or the like emerge from the solder as if lifted vertically therefrom. However, it is possible to adjust the relative speeds so that surface 33 moves faster than the speed of the conveyor carrying the printed circuit boards, resulting in a forward "washing" of the pins 31, or so that the speed of wave 33 is lower than that of the conveyor, resulting in a backward "washing" of the pins. The reference to printed circuit boards, particularly modern multi-layer printed circuit boards with connectors and/or socket pins, has been used to exemplify the extremely important advantages which the invention offers in the improvement of soldering conditions, which is also the case with other modern designs.

FIGS. 4a, 4b and 4c illustrate sections through the surface of the solder wave resulting from adjustment of the appropriately designed plate member 23 to produce the three conditions of the backward or peeling wave 33 as just mentioned, while maintaining a planar sloping upper surface 27 of the solder wave and serving for contact of the workpieces to be soldered.

Referring to FIG. 5, solder is forced upwardly through a nozzle formed by parts 35 and 36 of support plates 37 and 38 which are so shaped as to provide, in the direction of arrow 40, a flow of solder resulting in a planar sloping surface 41, and a flow, in the direction of the arrows 43, resulting in a backward peeling wave having a surface 42. Support plates 37 and 38 can be so shaped, if desired, that a solder flow with a horizontal planar or a curved surface is provided at 45, with parts of the surface 45 flowing in respective opposite directions. Board or surface 38 can be fixed or adjustable in height, and is interchangeable with support surface 23 of FIG. 3a.

With the present invention, it is possible to provide almost any desired contour of the wave surface, as required for use with a particular application, by suitably shaping the support surface of the support member engaging the undersurface of the flowing solder wave, in conjunction with dimensioning of the nozzle through which the solder flows upwardly as well as the flow rate, together with appropriate design of the back plate as well as possible adjustment of its effective height.

In known arrangements, the upper surface of the wave has been formed solely by gravitational forces, and it has been neccessary to adapt the soldering process to the wave shape. Additionally, with known arrangements, it has not been possible to control the speed, direction and shape of the back wave. So-called wave former elements have not changed the shape of the active wave surface, although they have produced some heating effect.

By means of the present invention, it is possible to have a surface area of solder, for contact with a board of almost any required size. For example, in addition to the wave widths of 4 inches to 30 inches mentioned above, waves having planar linear contact surface lengths of 2 inches to 6 inches in the direction of board travel can be obtained easily.

The angle of the planar sloping surface relative to the horizontal can be chosen according to requirements. Thus, an angle of 7°, for example, can be used, although more commonly an angle of between 4° and 6° is used.

As also mentioned above, the surface can be provided with a film of oil in a simple manner, as required, or such a film can be omitted. Additionally, the oil film may be provided in ways other than that shown and described.

The solder flows under gravitational forces and is accelerating, and it is supported in such a way that the necessary flow areas are developed by shaping the surfaces of the supporting plate according to the acceleration of the flow, so that the upper active surface of the solder wave can be planar and either horizontal or sloping. Additionally, it is possible to tailor the upper surface of the solder wave to suit the shape of a component, for example, hollowed. It is also possible to tailor the backward wave in a similar manner.

While specific embodiments of the invention have been shown and described in detail to illustrate the application of the principles of the invention, it will be understood that the invention may be embodied otherwise without departing from such principles.

What is claimed is:

1. In a method of processing workpieces, such as printed circuit boards, by passing the workpieces in contact with the upper surface of a standing wave of molten solder formed by circulating molten solder upwardly through a nozzle having a pair of opposite edges to overflow at least one edge thereof to form a standing wave, relatively elongated in a flow direction extending substantially horizontally and downwardly away from the associated edge, which is accelerated by gravity so that, if unsupported and out of contact with a workpiece, the wave has an upper surface ballistically curved downwardly in the direction of flow, the improvement comprising supporting the undersurface of the wave to have a relatively sharp curvature, in the direction of flow, adjacent the associated edge and thereafter to have a curvature, in the direction of flow, so chosen that, at every point along a major portion of the length of the standing wave, the distance between the upper and lower surfaces of the wave is such that the area of the active upper surface of the wave, along a major portion of its longitudinal extent in the direction of flow, is planar, with the cross-sectional area of the wave decreasing in the direction of flow, in the same manner as the cross sectional are of an unsupported wave following a ballistic curve in its trajectory, and passing the workpieces along a path of travel parallel to the planar portion of the active upper surface of the wave in a direction opposite to the flow direction of the wave while immersing the workpieces only slightly in the wave.

2. In a method of processing workpieces, such as printed circuit boards, the improvement claimed in claim 1, in which said substantially planar portion of the upper surface of the solder wave is inclined downwardly in the direction of flow.

3. In a method of processing workpieces, such as printed circuit boards, the improvement claimed in claim 2, in which the inclination of said substantially planar portion of the upper surface of the solder wave, with respect to the horizontal, is from 3° to 10°.

4. In a method of processing workpieces, such as printed circuit boards, the improvement claimed in claim 2, in which the inclination of said substantially planar portion of the upper surface of the solder wave, with respect to the horizontal, is from 4° to 6°.

5. In a method of processing workpieces, such as printed circuit boards, the improvement claimed in claim 1, in which said standing wave is formed by overflowing one edge of the nozzle to form a one-sided standing wave.

6. In a method of processing workpieces, such as printed circuit boards, the improvement claimed in claim 1, in which said standing wave is formed by overflowing a front edge of the nozzle; and controlling flow over a rear edge of the nozzle to control the contour of the upper surface of said standing wave.

7. In a method of processing workpieces, such as printed circuit boards, the improvement claimed in claim 6, including supporting the undersurface of the wave overflowing the rear edge of the nozzle to have a ballistic curvature in the direction of its flow.

8. Apparatus for processing workpieces, such as printed circuit boards, by passing the workpieces in contact with a standing wave of molten solder, comprising, in combination, an upwardly extending nozzle having a discharge end defined by a pair of relatively elongated substantially parallel edges; means circulating molten solder upwardly through said nozzle to overflow at least one edge thereof facing toward the direction of approach of the workpieces to the standing wave to form a standing wave, relatively elongated in a flow direction extending substantially horizontally and downwardly away from the associated edge, which is accelerated by gravity so that, if unsupported and out of contact with a workpiece, the wave has an upper surface ballistically curved downwardly in the direction of flow; and a support extending from said at least one edge and supporting the undersurface of the standing wave to have a relatively sharp curvature, in the direction of flow, adjacent the associated edge and thereafter to have a curvature in the direction of flow, so chosen that at every point along a major portion of the length of the standing wave, the distance between the upper and lower surfaces of the wave is such that the area of the active upper surface of the wave, along a major portion of its longitudinal extent in the direction of flow is planar, with the cross-sectional area of the wave decreasing, in the direction of flow, in the same manner as the cross-sectional area of an unsupported wave following a ballistic curve in its trajectory; whereby the workpieces may be moved parallel to the planar portion of the active upper surface of the wave in a direction opposite to the flow direction of the wave while being immersed only slightly in the wave.

9. Apparatus for processing workpieces, such as printed circuit boards, as claimed in claim 8, in which the orientation and contour of said support, in a vertical plane, are such that said planar major portion of the length of the upper surface of the wave is inclined downwardly in the direction of flow.

10. Apparatus for processing workpieces, such as printed circuit boards, as claimed in claim 9, in which the inclination of said planar major portion of the length of the upper surface of the wave to the horizontal is from 3° to 10°.

11. Apparatus for processing workpieces, such as printed circuit boards, as claimed in claim 2, in which said nozzle is defined by a pair of laterally spaced upwardly extending front and rear walls having said edges; said molten solder overlfowing the edge of the front wall and said support surface extending from said front wall; said rear wall being adjustable in height to vary the flow volume of said molten solder along said support surface.

12. Apparatus for processing workpieces, such as printed circuit boards, as claimed in claim 2, in which said nozzle is defined by a pair of laterally spaced upwardly extending front and rear walls having said edges; said molten solder overflowing the edge of teh front wall and said support surface extending from said front wall; and a second support surface extending upwardly and outwardly from said rear wall to support a peeling wave of molten solder flowing in the opposite direction to said standing wave for peeling excess solder from workpieces passing on contact with said planar major portion of the length of the upper surface of said standing wave.

13. Apparatus for processing workpieces, such as printed circuit boards, as claimed in claim 12, in which said second support surface has a longitudinal curvature.

14. Apparatus for processing workpieces, such as printed circuit boards, as claimed in claim 12, in which said second support surface is adjustable in height.

* * * * *